United States Patent [19]
Reddy et al.

[11] Patent Number: 5,380,463
[45] Date of Patent: Jan. 10, 1995

[54] METHOD OF MAKING NIOBIUM-ACTIVATED YTTRIUM TANTALATE X-RAY PHOSPHOR

[75] Inventors: Vaddi B. Reddy, Sayre, Pa.; Ha K. Cheung, Los Angeles, Calif.

[73] Assignee: Osram Sylvania Inc., Danvers, Mass.

[21] Appl. No.: 242,218

[22] Filed: May 13, 1994

Related U.S. Application Data

[63] Continuation-in-part of Ser. No. 160,323, Dec. 2, 1993, abandoned, which is a continuation of Ser. No. 993,338, Dec. 18, 1992, abandoned.

[51] Int. Cl.$^6$ .............................................. C09K 11/78
[52] U.S. Cl. ..................... 252/301.4 R; 252/301.4 H; 252/301.4 F
[58] Field of Search ................. 252/301.4 R, 301.4 H, 252/301.4 F

[56] References Cited

U.S. PATENT DOCUMENTS

| | | | |
|---|---|---|---|
| 4,225,653 | 9/1980 | Brixner | 252/301.4 R |
| 4,938,890 | 7/1990 | Reddy | 252/301.4 R |
| 5,064,729 | 11/1991 | Zegarski | 252/301.4 R |
| 5,141,673 | 8/1992 | Zegarski | 252/301.4 R |

*Primary Examiner*—Jack Cooper
*Attorney, Agent, or Firm*—Robert F. Clark

[57] ABSTRACT

The brightness and particle size of a niobium-activated yttrium tantalate x-ray phosphor can be increased by the addition of either barium fluorosilicate or calcium fluorosilicate thereto.

10 Claims, No Drawings

METHOD OF MAKING NIOBIUM-ACTIVATED YTTRIUM TANTALATE X-RAY PHOSPHOR

CROSS-REFERENCES TO RELATED APPLICATIONS

This application is a continuation-in-part of Ser. No. 0 08/160,323, filed Dec. 2, 1993 which was a continuation of Ser. No. 07/993,338, filed Dec. 18, 1992, both now abandoned.

TECHNICAL FIELD

This invention concerns niobium-activated yttrium tantalate x-ray phosphors.

BACKGROUND ART

Examples of such phosphors are disclosed in U.S. Pat. Nos. 4,225,653, 4,387,141, 4,959,174 and 4,970,024, the disclosures of which are incorporated herein by reference.

X-ray phosphors are used in medical intensifier screens to intensify x-ray images for x-ray films. It is known in the field of x-ray intensifier screens that larger particle size phosphors generally absorb more x-rays and render higher light output thereby reducing the x-ray dose to the patient. However, screens made with larger particle size phosphors have inherently poorer image resolution. Screens made with smaller particle size phosphors provide better resolution but have a lower light output thereby requiring higher x-ray doses. Consequently, it is generally known in the field to mix larger particle size phosphors with smaller particle size phosphors to achieve higher efficiency screens while minimizing the loss of resolution. Therefore, it would be an advantage to those persons working in the field of x-ray intensifier screens to provide a method which would increase the brightness or particle size, or both, of the phosphors used in x-ray intensifier screens.

SUMMARY OF THE INVENTION

It is an object of this invention to provide a method for making higher brightness niobium-activated yttrium tantalate x-ray phosphors.

It is a further object of this invention to provide a method for making larger particle size niobium-activated yttrium tantalate x-ray phosphors.

In accordance with the objects of this invention, a method is provided comprising the steps of: adding barium fluorosilicate or calcium fluorosilicate to stoichiometric quantities of yttrium oxide, tantalum oxide and niobium oxide and between 33 and 50 wt. % of a lithium chloride containing flux and then firing the mixture to produce niobium-activated yttrium tantalate x-ray phosphors.

DESCRIPTION OF THE PREFERRED EMBODIMENTS

For a better understanding of the present invention, together with other and further objects, advantages and capabilities thereof, reference is made to the following disclosure and appended claims.

Niobium-activated yttrium tantalate x-ray phosphors can made by mixing yttrium oxide, tantalum oxide, niobium oxide and a flux and then firing. We have found that if barium or calcium is added to the mixture, the brightness of the phosphor under x-ray optical fluorescence can be significantly improved. Initially, calcium was not found to yield such an improvement, however, subsequent work using a lithium chloride-lithium sulfate eutectic flux and higher niobium activator concentrations did produce such an improvement in brightness. Furthermore, it has been discovered that additions of either calcium fluorosilicate or barium fluorosilicate increased the particle size of the resultant phosphor for all fluxes and activator concentrations which were tested.

The phosphors examined herein have the general formula $YTa_{1-x}Nb_xO_4$, where x is from 0.005 to 0.02. The fluxes used were either lithium chloride or a lithium chloride-lithium sulfate eutectic, $(LiCl)_2$—$Li_2SO_4$. The use of these fluxes in the preparation of yttrium tantalate x-ray phosphors is described in U.S. Pat. No. 4,938,890. Although the preferred firing temperature for these mixtures is 1290° C., the firing of the mixture to form the phosphor can be done at a temperature of 1200°–1400° C. The brightness measurements of the samples prepared in the following examples were made by x-ray optical fluorescence (XOF). Particles sizes were measured by Coulter Counter. Weight percents are based on the total weight of the mixture.

The following non-limiting examples are presented.

EXAMPLE 1

Stoichiometric quantities of $Y_2O_3$, $Ta_2O_5$, $Nb_2O_5$ ($YTa_{0.995}Nb_{0.005}O_4$) and 33 wt. % of lithium chloride were, weighed mixed and then blended in a plastic container. The mixture was then fired, using a slow heating program, at 1290° C. for 12 hours. The cooled cake was then thoroughly washed, filtered and dried. A sample of this phosphor yielded a brightness of 102% and had a particle size of 8.5 microns. The addition to the mixture of 0.02 moles of barium fluorosilicate per mole of phosphor, in the form of $BaF_6Si$, gave a sample that had a brightness of 121% and a particle size of 11.6 microns. The addition of 0.03 moles of $BaF_6Si$ per mole of phosphor gave a brightness result of 121% and a particle size of 10.3 microns. However, additions of 0.02 moles and 0.03 moles of calcium per mole of phosphor, in the form of $CaF_6Si$, yielded brightness results of 106% and 97% respectively. Still, the additions of 0.02 and 0.03 moles of $CaF_6Si$ per mole of phosphor yielded increased particle sizes of 9.8 and 9.9 microns, respectively.

EXAMPLE 2

Stoichiometric quantities of $Y_2O_3$, $Ta_2O_5$, $Nb_2O_5$ ($YTa_{0.98}Nb_{0.02}O_4$) and 50 wt. % of lithium chloride were combined and processed as in Example 1. The sample which contained no barium or calcium additions had a brightness of 98% and a particle size of 7.3 microns. The samples containing additions of 0.02 moles and 0.03 moles of $BaF_6Si$ per mole of phosphor had brightness results of 106% and 98% and particles sizes of 10.1 and 11.1 microns, respectively. No calcium additions were made.

EXAMPLE 3

Stoichiometric quantities of $Y_2O_3$, $Ta_2O_5$, $Nb_2O_5$ ($YTa_{0.98}Nb_{0.02}O_4$) and 33 wt. % of a lithium chloride-lithium sulfate eutectic flux were combined and processed as in Example 1. The results of the barium and calcium additions to these samples are given in the following table.

| BaF$_6$Si (moles/mole of phosphor) | CaF$_6$Si (moles/mole of phosphor) | XOF Brightness | Particle Size (microns) |
| --- | --- | --- | --- |
| — | — | 111.7 | 6.5 |
| 0.02 | — | 124.3 | 9.1 |
| 0.03 | — | 122.0 | 9.1 |
| 0.04 | — | 116.0 | 8.5 |
| — | 0.02 | 132.0 | 8.5 |
| — | 0.04 | 110.6 | 8.2 |

While there has been shown and described what are at the present considered the preferred embodiments of the invention, it will be obvious to those skilled in the art that various changes and modifications may be made therein without departing from the scope of the invention as defined by the appended claims.

We claim:

1. A method for making a niobium activated yttrium tantalate x-ray phosphor, comprising the steps of:
   forming a mixture of stoichiometric quantities of yttrium oxide, tantalum oxide and niobium oxide in the molar ratio of YTa$_{1-x}$Nb$_x$O$_4$, where x is from 0.005 to 0.02, the mixture also containing a LiCl containing flux in an amount between about 33 to about 50 weight percent of the total weight of the mixture and 0.02 to 0.04 moles of calcium fluorosilicate per mole of phosphor in the form of CaF$_6$Si, and firing the mixture in a temperature range between 1200°–1400° C.

2. The method of claim 1 wherein the firing is done at a temperature of 1290° C.

3. The method of claim 1 wherein the LiCl containing flux is a (LiCl)$_2$—Li$_2$SO$_4$ eutectic flux.

4. The method of claim 1 wherein the LiCl containing flux is LiCl.

5. A method for making a niobium activated yttrium tantalate x-ray phosphor, comprising the steps of:
   forming a mixture of stoichiometric quantities of yttrium oxide, tantalum oxide and niobium oxide in the molar ratio of YTa$_{1-x}$Nb$_x$O$_4$, where x is from 0.005 to 0.02, the mixture also containing a LiCl containing flux in an amount between about 33 to about 50 weight percent of the total weight of the mixture and 0.02 to 0.04 moles of barium fluorosilicate per mole of phosphor in the form of BaF$_6$Si, and firing the mixture in a temperature range between 1200°–1400° C.

6. The method of claim 5 wherein the firing is done at a temperature of 1290° C.

7. The method of claim 5 wherein the LiCl containing flux is a (LiCl)$_2$—Li$_2$SO$_4$ eutectic flux.

8. The method of claim 5 wherein the LiCl containing flux is LiCl.

9. A method for making a niobium activated yttrium tantalate x-ray phosphor, comprising the steps of:
   forming a mixture of stoichiometric quantities of yttrium oxide, tantalum oxide and niobium oxide in the molar ratio of YTa$_{0.995}$Nb$_{0.005}$O$_4$, the mixture also containing LiCl as a flux in an amount equal to about 33 weight percent of the total weight of the mixture and 0.02 to 0.03 moles of barium fluorosilicate per mole of phosphor in the form of BaF$_6$Si, and firing the mixture in a temperature range between 1200°–1400° C.

10. The method of claim 9 wherein the firing is done at a temperature of 1290° C.

* * * * *